July 29, 1947.  L. W. TOWNSEND  2,424,779
INGOT FOR AND METHOD OF MAKING COMPOSITE ARTICLES
Filed April 16, 1945
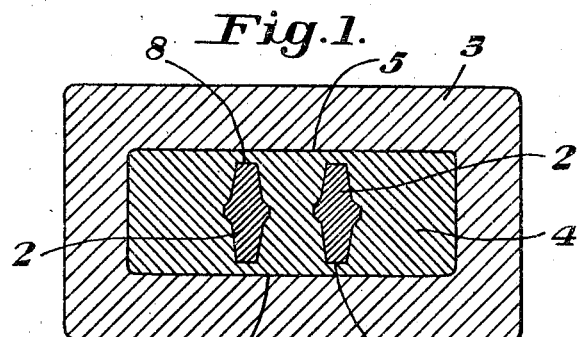
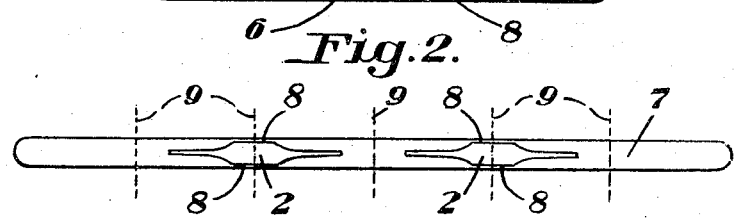
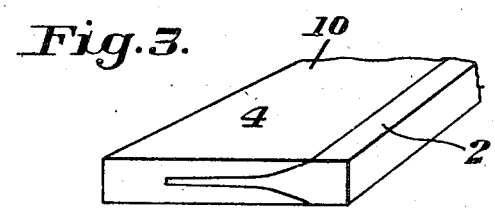
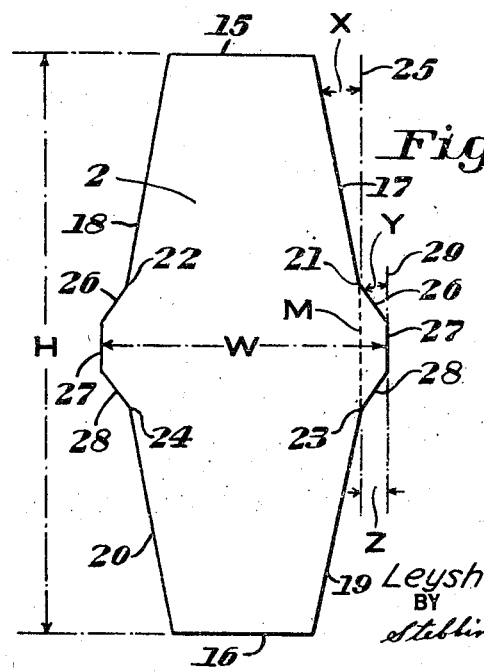
INVENTOR
Leyshon W. Townsend
BY
Stebbins, Blenko & Webb
ATTORNEYS Patented July 29, 1947

2,424,779

UNITED STATES PATENT OFFICE 2,424,779

INGOT FOR AND METHOD OF MAKING COMPOSITE ARTICLES

Leyshon W. Townsend, Washington, Pa., assignor to Jessop Steel Company, Washington, Pa., a corporation of Pennsylvania Application April 16, 1945, Serial No. 588,611

5 Claims. (Cl. 29—187.5)

This invention relates to the manufacture of composite or bimetallic stock in the form of bars or strips for the production of cutting tools of various types such as lathe and plainer tools, saws and the like comprising a body of a cheaper and softer metal such as ordinary or lightly alloyed steel and a smaller portion of a harder metal such as high speed steel, high carbon, high chrome steel and the like, the latter being permanently welded to the former so as to form one or both of the narrower faces of the generally flat bar or strip. The present invention relates more particularly to an ingot having embedded therein at least one insert bar of particular cross sectional shape and dimensions, the insert bar of the present invention being an improvement over the insert bar disclosed in Trembour Patent No. 1,952,002. I have found that superior composite articles can be made from the ingot if the insert bar has the cross sectional shape and dimensions hereinafter more fully described. I produce a better bond between the insert bar of high speed steel and the body of plain carbon steel. The composite article is also of greater strength, i. e. is more shatterproof and economies are effected in the production of the composite article due to the shape and dimensions of the insert bar.

In the accompanying drawings which illustrate a preferred cross sectional shape and dimensions of insert bar and also illustrate in a somewhat diagrammatic manner the method of forming composite articles.

Figure 1 is a horizontal section through a vertical mold showing the insert bars of high speed steel in the mold and surrounded by an envelope of plain carbon steel;

Figure 2 illustrates a band made by rolling down the ingot produced according to Figure 1 to a much smaller thickness;

Figure 3 is a perspective view, on an enlarged scale as compared with Figure 2, of a portion of a strip formed by severing the band along the dotted lines of Figure 2; and Figure 4 is a cross section of the insert bar, this figure showing the preferred shape and dimensions of the insert bar.

Before referring specifically to the cross sectional shape and dimensions of the insert bar which are essential features of this invention, I will describe briefly the manner in which a composite article such as a hacksaw blade having a body of plain carbon steel and an edge of high speed steel can be made. Referring to Figure 1, insert bars 2 of high speed steel are placed in a mold 3 which preferably stands vertically and plain carbon steel 4 is cast about the inserts in order to completely envelope them. Before casting the plain carbon steel about the inserts, the inserts are suitably cleaned, and if desired electrolytically plated with iron in order to increase the bonding action between the plain carbon steel and the high speed steel inserts. Although in Figure 1 I have shown only two insert bars 2, it will be understood that a greater or less number of insert bars may be used. In carrying out the process commercially, it is preferred to have seven insert bars in a mold. A suitable mold 3 is 35" long, 24" wide and has a mold cavity which is 3¾" deep. In using this mold, the insert bars are 30" long and are spaced transversely of the mold, a distance of 2¾" from each other. The first insert bar is spaced 3¾" from the side of the mold.

After the plain carbon steel 4 has been cast about the high speed steel inserts 2, as shown in Figure 1 to form an ingot, the ingot is removed from the mold and is reduced in thickness by applying pressure to the faces 5 and 6 as by rolling, thereby producing the band 7 shown in Figure 2. At this stage in the process the inserts 2 are still completely enveloped in the plain carbon steel 4. The lower and upper faces 5 and 6 are then removed as by grinding to expose the lower and upper faces 8 of the inserts and then the band is severed longitudinally as indicated by the dotted lines 9, thereby providing the strip 10 shown in Figure 3. This strip has a body portion 4 of plain carbon steel and an edge 2 of high carbon steel, the edge and body being firmly welded to each other by the rolling operation. If a hacksaw blade is to be made from the composite article shown in Figure 3, teeth are cut in the high speed steel edge 2.

The general process as thus far described is disclosed in the Trembour patent previously mentioned, and no claim is made herein to the process generally. The invention herein claimed deals with the shape and dimensions of the insert bar now to be described more in detail.

Referring more particularly to Figure 4, the insert bar 2 has a flat top surface 15 and a flat bottom surface 16. The sides 17 and 18 are sloping and diverge from the top 15 toward the mid portion of the insert bar. Likewise the sides 19 and 20 are sloping and diverge from the bottom 16 toward the mid portion of the insert bar. The sloping sides 17, 18, 19 and 20, instead of being extended to meet each other, terminate short of the mid portion of the insert, the termum of these sides being respectively designated by the reference numerals 21, 22, 23 and 24. The insert bar is symmetrical so that the angle of the slope of the sides 17, 18, 19 and 20 is substantially the same. The angle of slope is an important consideration in the design of the insert bar, and in the embodiment shown this angle X is about 12°, that is, the angle X between the sloping side 17 for instance and the vertical line 25 is approximately 12°. According to this invention, this angle should be not less than 10° and not more than 15°.

A projection formed by the surfaces 26, 27 and 28 lies on each side of the cross section of the insert bar. The sides 26 and 28 slope at a greater angle to the vertical than the sides 17, 18, 19 and 20. In other words the angle Y between the surface 26 and the vertical line 29 is greater than the angle X but is less than 90°.

In the embodiment illustrated in Figure 4, the projections formed by these surfaces 26, 27 and 28 extend outwardly beyond the points 21 and 23 or the points 22 and 24 a distance of ⅛", this distance being designated by Z. According to the invention, this distance Z should not be less than 3/32" or more than ½ the vertical distance between the points 21 and 23.

The distance M which is the vertical distance between the points 21 and 23 should be not less than 3/16" and should be not more than ⅓ of the total height H of the insert bar. The ratio of total height H of insert bar to total width W of insert bar should be between 1.5:1 and 3:1, preferably about 2:1. If the ratio of height to width is too great, the insert bars tend to turn over or buckle in rolling the ingot containing the bars. It has been found that these objectionable tendencies may be overcome by maintaining the ratio of height to width as above specified. On the other hand if the ratio of height to width of insert bar is too small, the composite article after rolling is such that the high speed steel insert portion (2 of Figure 3) extends so far into the body portion 4 of plain carbon steel that the article is not shatterproof and may break in use. Another disadvantage of having the ratio of height to width too small is that it increases the cost of composite articles.

As previously stated, the value of the angle X is very important. If the width of the top 15 and bottom 16 are kept constant, increasing the angle X increases the width W. This increase in angle X is desirable from certain standpoints and undesirable from other standpoints. It increases the bonding action between the plain carbon steel and the high speed steel insert during rolling. However, this increased bonding is accompanied by an increased tendency of the composite tool to shatter in use. Furthermore, the cost of the composite article is increased by increasing the angle X. I have found that in order to obtain the proper bonding action between the insert and the body material while still retaining sufficient shatterproof properties in the composite article, the angle X should be not less than 10° nor more than 15°.

I have found that in order to obtain good bonding action and good shatterproof qualities in the composite article, the value of Z, which is the distance that the projection extends outwardly beyond the points 21 and 23 or points 22 and 24, should be not less than 3/32" nor more than ½ the vertical distance M. Further improvements in results are obtained when the dimension M, which is the vertical distance between the points 21 and 23 or between points 22 and 24, is not less than 3/16" and not more than ⅓ of the height H of the insert bar.

By employing insert bars of the shape and dimensions herein described, composite articles which are superior from the standpoint of bonding action between the insert and base material, shatterproof qualities and economy in manufacture are obtained.

The invention is not limited to the exact dimensions or shape illustrated or described but may be otherwise embodied or practiced within the scope of the following claims.

I claim:

1. An ingot for use in the manufacture of composite strips having a body of relatively soft metal and an edge of relatively hard metal, said ingot comprising at least one insert bar of relatively hard metal embedded in and completely enclosed by an envelope of relatively soft metal, each insert bar being solid and symmetrical in cross section and having a flat top and bottom, sloping sides diverging from both top and bottom toward but stopping short of the mid portion of the insert, the angle of slope of the sides being between 10 and 15°, and a projection on each side of the cross section connecting the adjacent ends of the sloping sides, each projection extending outwardly beyond the sloping sides a distance not less than 3/32" and not more than ½ the vertical distance between the adjacent ends of the sloping sides, the insert having a ratio of height to width between 1.5:1 and 3:1.

2. An ingot for use in the manufacture of composite strips having a body of relatively soft metal and an edge of relatively hard metal, said ingot comprising at least one insert bar of relatively hard metal embedded in and completely enclosed by an envelope of relatively soft metal, each insert bar being solid and symmetrical in cross section and having a flat top and bottom, sloping sides diverging from both top and bottom toward but stopping short of the mid portion of the insert, the angle of slope of the sides being between 10 and 15°, and a projection on each side of the cross section connecting the adjacent ends of the sloping sides, each projection extending outwardly beyond the sloping sides a distance not less than 3/32" and not more than ½ the vertical distance between the adjacent ends of the sloping sides, the insert having a ratio of height to width between 1.5:1 and 3:1, the vertical distance between the adjacent ends of the sloping sides being not less than 3/16" and not more than ⅓ of the height of the insert.

3. An ingot for use in the manufacture of composite strips having a body of relatively soft metal and an edge of relatively hard metal, said ingot comprising at least one insert bar of relatively hard metal embedded in and completely enclosed by an envelope of relatively soft metal, each insert bar being solid and symmetrical in cross section and having a flat top and bottom, sloping sides diverging from both top and bottom toward but stopping short of the mid portion of the insert, the angle of slope of the sides being between 10 and 15°, and a projection on each side of the cross section connecting the adjacent ends of the sloping sides, each projection extending outwardly beyond the sloping sides a distance not less than 3/32" and not more than ½ the vertical distance between the adjacent ends of the sloping sides, each projection having two sloping portions converging toward the mid portion of the insert, the slope of the sloping portions of the projections being greater than the slope of the sloping sides of the insert but less than 90°, the insert having a ratio of height to width between 1.5:1 and 3:1.

4. An ingot for use in the manufacture of composite strips having a body of relatively soft metal and an edge of relatively hard metal, said ingot comprising at least one insert bar of relatively hard metal embedded in and completely enclosed by an envelope of relatively soft metal, each insert bar being solid and symmetrical in cross section and having a flat top and bottom, sloping sides diverging from both top and bottom toward but stopping short of the mid portion of the insert, the angle of slope of the sides being between 10 and 15°, and a projection on each side of the cross section connecting the adjacent ends of the sloping sides, each projection extending outwardly beyond the sloping sides a distance not less than $\frac{3}{32}''$ and not more than ½ the vertical distance between the adjacent ends of the sloping sides, each projection having two sloping portions converging toward the mid portion of the insert, the slope of the sloping portions of the projections being greater than the slope of the sloping sides of the insert but less than 90°, the insert having a ratio of height to width between 1.5:1 and 3:1, the vertical distance between the adjacent ends of the sloping sides being not less than $\frac{3}{16}''$ and not more than ⅓ of the height of the insert.

5. The method of making composite strips having a body of relatively soft metal and an edge of relatively hard metal, which comprises providing an ingot comprising at least one insert bar of relatively hard metal embedded in and completely enclosed by an envelope of relatively soft metal, each insert bar being solid and symmetrical in cross section and having a flat top and bottom, sloping sides diverging from both top and bottom toward but stopping short of the mid portion of the insert, the angle of slope of the sides being between 10 and 15°, and a projection on each side of the cross section connecting the adjacent ends of the sloping sides, each projection extending outwardly beyond the sloping sides a distance not less than $\frac{3}{32}''$ and not more than ½ the vertical distance between the adjacent ends of the sloping sides, the insert having a ratio of height to width between 1.5:1 and 3:1, reducing the thickness of the ingot to form a band and severing the band longitudinally through the insert bars.

LEYSHON W. TOWNSEND.

REFERENCES CITED

The following references are of record in the file of this patent:

UNITED STATES PATENTS

| Number | Name | Date |
|---|---|---|
| 2,060,858 | Flynt | Nov. 17, 1936 |
| 155,180 | Coes | Sept. 22, 1874 |
| 377,318 | Marshall | Sept. 22, 1874 |
| 1,952,002 | Trembour | Mar. 20, 1934 |